Aug. 18, 1953  F. E. ALTMAN  2,649,026
FOUR COMPONENT APOCHROMATIC COPYING OBJECTIVE
Filed March 25, 1952
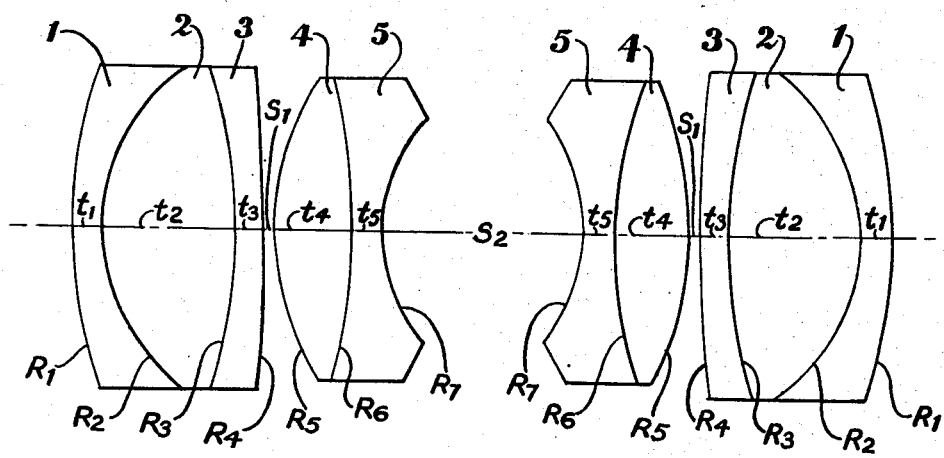
| Lens | N | V | Radii | Thicknesses |
|---|---|---|---|---|
| 1 | 1.621 | 61.5 | $R_1 = +67.63$ mm. | $t_1 = 2.76$ mm. |
| 2 | 1.638 | 55.5 | $R_2 = +22.37$ | $t_2 = 14.72$ |
| 3 | 1.649 | 33.8 | $R_3 = -71.34$ | $t_3 = 3.21$ |
|   |       |      | $R_4 = -1056.$ | $S_1 = 0.15$ |
| 4 | 1.617 | 55.0 | $R_5 = +26.25$ | $t_4 = 10.25$ |
| 5 | 1.635 | 43.8 | $R_6 = -59.06$ | $t_5 = 2.40$ |
|   |       |      | $R_7 = +18.98$ | $S_2 = 22.33$ |
| SYMMETRICAL ||||| 
*Fred E. Altman*
INVENTOR.
BY
ATTY. & AGT.

Patented Aug. 18, 1953

2,649,026

UNITED STATES PATENT OFFICE 2,649,026

FOUR COMPONENT APOCHROMATIC COPYING OBJECTIVE

Fred E. Altman, Rochester, N. Y., assignor to Eastman Kodak Company, Rochester, N. Y., a corporation of New Jersey Application March 25, 1952, Serial No. 278,464

3 Claims. (Cl. 88—57)

This invention relates to photographic objectives for copying photographs, for example, in motion picture printers.

A known type of objective consists of a pair of negative meniscus cemented doublets concave toward each other and axially aligned between a pair of positive components which may be single elements or compound. Usually a diaphragm is mounted between the negative components. Also, it is known to make up the positive components as triplets each consisting of a negative element cemented between two positive elements having lower dispersions (higher dispersive indices).

When adapted for copying work covering a moderate field of 12° or less, this type objective generally is made up with the positive components slightly meniscus, plano-convex or biconvex, the outer surfaces being at least 8 times as strongly curved as the inner surfaces facing the negative components. When adapted for copying at unit magnification the objective is conveniently made up in an exactly symmetrical form, but not necessarily so.

According to the present invention, a very highly corrected semi-apochromatic copying objective broadly of the above-described type is made up in which the positive components are triplets each consisting of a biconvex element cemented between two negative elements, the inner one having a dispersive index between 0.5 and 0.7 times and the outer one between 1.05 and 1.2 times that of the biconvex element, and in which each negative meniscus doublet is made up of a biconcave element of short flint glass having a refractive index between 1.58 and 1.68 and a dispersive index between 40 and 48 and a biconvex element having a refractive index also between 1.56 and 1.66 and a dispersive index between 56 and 65. As explained, for example, in Patent No. 2,544,901, Schade, the term "short" glass means a glass in which $$(N_g - N_F) + 0.00169(N_D - 1) < 0.636(N_F - N_C)$$

where each N denotes the refractive index of the glass for the spectral line indicated by its subscript.

The short flint glass largely corrects the secondary color and the above-described combination of dispersive indices in the positive triplets corrects the sphero-chromatism to a very high degree.

Preferably all the glasses used in the positive triplets have refractive indices between 1.58 and 1.72.

Preferably also the radii of curvature of the lens surfaces in each half of the objective numbered in order from the outside to the center of the objective are within the limits set forth in the following table of inequalities:

$$0.61\ F < +R_1 < 0.75\ F$$
$$0.20\ F < +R_2 < 0.25\ F$$
$$0.65\ F < -R_3 < 0.80\ F$$
$$-0.25 < \frac{F}{R_4} < +0.05$$
$$0.24\ F < +R_5 < 0.28\ F$$
$$0.53\ F < -R_6 < 0.66\ F$$
$$0.18\ F < +R_7 < 0.20\ F$$

where F is the focal length of the objective, and where the + and − values of the radii denote surfaces respectively concave and convex toward the center of the objective. It will be noted that $R_4$ is defined in terms of its reciprocal, which measures the curvature of the surface, and that the range of values of curvature defined extends from −0.25 (convex) through zero (plane) to +0.05 (slightly concave). The curvature of a surface is generally of greater optical significance than the radius of curvature itself and could well be used to define all the surfaces. However, in the case of all the other surfaces the curvature range does not pass through zero, and R is defined directly for greater convenience.

The objective may be made up in exactly symmetrical form, in which case each R has the same value for the front half as for the back half of the objective, but if preferred, the objective may be somewhat unsymmetrical, in which case some or all of the radii have different values in the two halves, each within the range specified. This abbreviated notation cuts the length of the above table by half.

The accompanying drawing shows in diagrammatic axial section an objective according to the invention and gives constructional data for one specific embodiment thereof.

The specifications for the front half are given, and the notation "Symmetrical" will be understood to mean that the corresponding dimensions of the back half are numerically equal respectively to the ones given.

The table given in the drawing is repeated here for convenience, the focal length being 100 mm. for the whole objective and 104.4 mm. for each half.

| Lens | N | V | Radii, mm. | Thicknesses, mm. |
|---|---|---|---|---|
| 1 | 1.621 | 61.5 | $R_1=+67.63$ | $t_1=2.76$ |
| 2 | 1.638 | 55.5 | $R_2=+22.37$ | $t_2=14.72$ |
| 3 | 1.649 | 33.8 | $R_3=-71.34$ | $t_3=3.21$ |
|   |       |      | $R_4=-1056.$ | $s_1=.15$ |
| 4 | 1.617 | 55.0 | $R_5=+26.25$ | $t_4=10.25$ |
| 5 | 1.635 | 43.8 | $R_6=-59.06$ | $t_5=2.40$ |
|   |       |      | $R_7=+18.98$ | $s_2=22.33$ |

Symmetrical.

In this table the lens elements are numbered in the first column in order from the front to the center of the objective, the corresponding indices of refraction N for the D line of the spectrum and the dispersive indices V are given in the next two columns. The last two columns give the radii of curvature R of the lens surfaces, the thicknesses $t$ of the lens elements, and the spaces $s$ between components each numbered by subscripts from the front of the objective to the center. The notation "Symmetrical" denotes that the back half of the objective (designated by "primed" reference characters) has the same specifications as the front half. The space $s_2$ as given is the distance between the two doublet components.

It will be noted that the specifications of this objective are in every respect within the limits of the invention as above specified. It may also be mentioned that for convenience in manufacture the thickness of each negative element is between 0.02 F and 0.05 F and that of each positive element is between 0.08 F and 0.18 F. Also, the doublet and triplet in each half of the objective may be in axial contact, i. e., have zero spacing (although this condition generally leads to inconvenience in mounting) and are preferably spaced less than 0.02 F apart. The space $s_2$ between the two doublets may be adjusted during final assembly to give a prescribed object-to-image distance, and is preferably between 0.16 F and 0.28 F.

The glass used in lens elements 1 is a dense barium crown and that used in elements 5 is a short flint glass, both made by the Eastman Kodak Co. and identified as EK-96 and EKF-495 glasses respectively. Short flint glasses of this type are also described in Patent No. 2,511,228, Sun, Callear, and Sharf. The other three glasses are standard types supplied by the Bausch and Lomb Optical Co. and other glassmakers.

This objective has been made up in a 112 mm. focal length and gives very excellent results in copying 35 mm. color film at 1-to-1 magnification, the effective aperture of each half of the objective being f/4.

The formula used above and in the claims to define short flint glasses is often given in the slightly different form $$\frac{N_g-N_F}{N_F-N_C}+0.00169\frac{N_D-1}{N_F-N_C}<0.636$$

or, expressed in the customary notation, $$P_s+0.00169\,V<0.636$$

and may be more familiar in this form.

I claim:

1. A photographic objective consisting of two positive cemented triplet components and two negative meniscus cemented doublet components axially aligned therebetween, in which the radii of curvature R of the lens surfaces of each half of the objective numbered by subscripts in order from the end of the objective to the center thereof are within the limits set forth in the following table of algebraic inequalities:

$$0.61\ F<+R_1<0.75\ F$$
$$0.20\ F<+R_2<0.25\ F$$
$$0.65\ F<-R_3<0.80\ F$$
$$-0.25<\frac{F}{R_4}<+0.05$$
$$0.24\ F<+R_5<+0.28\ F$$
$$0.53\ F<-R_6<0.66\ F$$
$$0.18\ F<+R_7<0.20\ F$$

where F is the focal length of the objective and where the + and − values of the radii denote surfaces respectively concave and convex toward the center of the objective, and in which objective the refractive indices of all glasses used in the triplet components are between 1.58 and 1.72.

2. An objective according to claim 1 in which the two halves of the objective are substantially symmetrical and equal.

3. An objective according to claim 1 in which each doublet consists of a biconcave element of short flint glass having a refractive index between 1.58 and 1.68 and a dispersive index between 40 and 48 and a biconvex element of a glass having a refractive index between 1.56 and 1.66 and a dispersive index between 1.2 and 1.6 times that of the short flint glass, and in which the outside element of each triplet has a dispersive index between 1.05 and 1.2 times and the inside element facing the doublets has a dispersive index between 0.5 and 0.7 times that of the center element thereof, wherein a short flint glass is defined as a glass in which $$(N_g-N_F)+0.00169(N_D-1)<0.636(N_F-N_C)$$

where each N denotes the refractive index of the glass for the spectral line indicated by its subscript.

FRED E. ALTMAN.

References Cited in the file of this patent

UNITED STATES PATENTS

| Number | Name | Date |
|---|---|---|
| 583,336 | Rudolph | May 25, 1897 |

FOREIGN PATENTS

| Number | Country | Date |
|---|---|---|
| 321,078 | Great Britain | Oct. 31, 1929 |
| 376,044 | Great Britain | July 7, 1932 |
| 480,641 | Great Britain | Feb. 25, 1938 |
| 548,254 | Great Britain | Oct. 2, 1942 |